(No Model.)

R. WELLER.
CUTTER FOR BUTTER, LARD, &c.

No. 353,614. Patented Nov. 30, 1886.

Witnesses.
Jennie M. Caldwell.
F. F. Stiker.

Inventor.
Russell Weller,
By James Sangster
atty.

United States Patent Office.

RUSSELL WELLER, OF BUFFALO, NEW YORK.

CUTTER FOR BUTTER, LARD, &c.

SPECIFICATION forming part of Letters Patent No. 353,614, dated November 30, 1886.

Application filed January 15, 1886. Serial No. 188,690. (No model.)

*To all whom it may concern:*

Be it known that I, RUSSELL WELLER, a citizen of the United States, residing in Buffalo, in the county of Erie and State of New York, have invented certain new and useful Improvements in Cutters for Butter, Lard, or other Similar Materials, of which the following is a specification.

The object of my invention is to provide a suitable and convenient means for cutting butter in pound-rolls, or more or less, as may be desired.

It is well known that butter packed solid in firkins or jars is usually cut out in unsightly pieces of various sizes and shapes, which is objectionable, besides being troublesome to get the exact weight. My invention is designed to obviate this by a suitable device for readily cutting out symmetrical rolls of butter of the required weight, all of which will be fully and clearly hereinafter shown, described, and claimed by reference to the accompanying drawings, in which—

Figure 1:
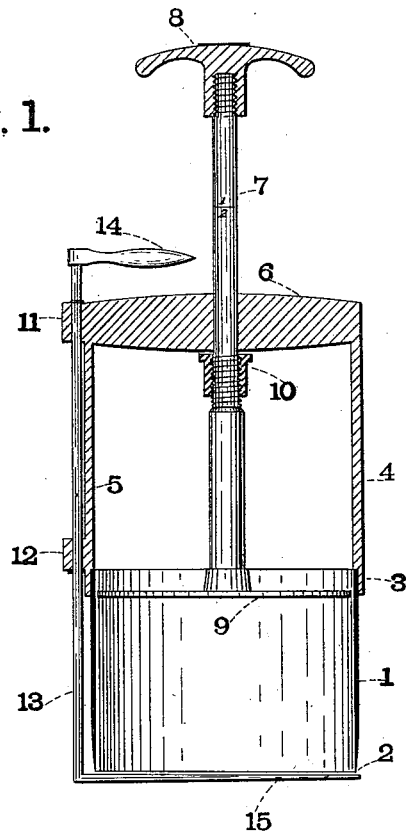
Figure 2:
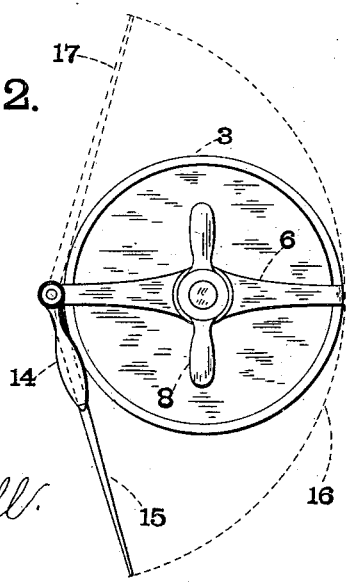

Figure 1 is a vertical central section, cutting through all except the piston and cutter and its handle; and Fig. 2 is a plan or top view of the complete device.

In Fig. 1, 1 represents a cylindrical or tubular knife. It may be made of steel or any other suitable metal, and is provided with a sharp cutting-edge, 2. It is rigidly secured at the top to the frame-rim 3. From this rim project two upright bars, 4 and 5, having a cross-bar, 6, connected thereto, or formed in one piece with the rim 3.

Through the cross-bar passes a rod, 7, having a handle, 8, at the top, which may be made of any well-known form suitable for the purpose. The lower end of the rod 7 is provided with a piston, 9, fitted nicely, so as to be easily moved up or down within the tubular cutter 1.

10 represents a small sleeve adapted to screw up or down a short distance on the rod 7, and serves as a gage to adjust or limit the distance the piston shall move upward, and thereby regulate the amount or the size and weight of the roll of butter to be cut. It may be provided with the usual jam-nut, if required. The piston 9 is secured to the rod 7 by a screw, or in any other well-known way.

On the upright 5 and cross-piece 6, respectively, are the lugs or projecting pieces 11 and 12, through which passes the vertical rod 13, having a handle, 14, at the top and a cutter, 15, rigidly secured to it at the bottom.

The operation of the invention is as follows: The cutter 15 is turned in the position shown in Fig. 2, and then the tubular cutter 1 and cutter 15 are forced down into a package of butter until stopped by the piston 9. The cutter 15 is now made to swing around, by means of the handle 14, in the direction of the dotted lines 16 into the position shown by the dotted lines 17, (see Fig. 2,) thereby cutting off the butter. The device is now withdrawn and the roll of butter forced out by the piston 9 being pushed down by means of the handle 8. After the first roll has been cut out the cutter 15, instead of passing down through the butter, may be passed down through the opening left by the roll of butter previously taken out.

It will be seen from this construction that a roll of butter may be cut in one solid piece and of a given size, instead of being cut in parts and then united together again; and it is also obvious that the top or that portion above the rim 3 and the piston, being open, any butter that may gather above the piston during the operation of the device may be easily got at and removed.

I am aware that it is not new to cut butter by means of a cylindrical cutter and a follower or piston combined with a swinging knife, as that has been done before. I therefore do not claim such construction, broadly; but What I do claim is—

The open-top tubular cutter 1, secured to the rim 3, and the vertical frame-pieces 4 5 and cross-bar 6, the cross-bar 6 having a lug, 11, and the vertical bar 5 a lug, 12, in which is secured a vertical rod having a handle, 14, at the top and a swinging cutter, 15, at the bottom, in combination with a vertical rod, 7, provided with a handle, 8, an adjusting-sleeve, 10, and a piston, 9, substantially as and for the purposes described.

RUSSELL WELLER.

Witnesses:
JENNIE M. CALDWELL,
JAMES SANGSTER.